United States Patent [19]

Seibold et al.

[11] Patent Number: 5,382,309
[45] Date of Patent: Jan. 17, 1995

[54] METHOD OF MAKING A FIBER REINFORCED CERAMIC GLASS COMPOSITES HAVING TAILORED COEFFICIENT OF THERMAL EXPANSION

[75] Inventors: Robert W. Seibold, Santa Monica; Bruce W. Buller, Walnut; James O. Gibson, El Segundo, all of Calif.

[73] Assignee: Hughes Aircraft Company, Los Angeles, Calif.

[21] Appl. No.: 60,143

[22] Filed: May 13, 1993

Related U.S. Application Data

[62] Division of Ser. No. 766,320, Sep. 27, 1991, Pat. No. 5,229,196.

[51] Int. Cl.$^6$ ............... B29B 11/04; C01B 31/00; C04B 33/34
[52] U.S. Cl. ................... 156/242; 264/29.7; 264/44; 264/62; 156/89; 501/7; 501/80
[58] Field of Search ............ 427/331, 350, 372.2, 427/379, 384, 398.4, 294, 226, 228; 264/56, 58, 63, 66, 544, 545, 547, 257, 294, 29.7, 44, 62; 501/7, 80; 156/77, 89, 145, 242, 245

[56] References Cited

U.S. PATENT DOCUMENTS

| | | | |
|---|---|---|---|
| 3,766,000 | 10/1973 | Gibson et al. | 161/170 |
| 4,100,322 | 7/1978 | Seibold et al. | 428/257 |
| 4,215,161 | 7/1980 | Seibold et al. | 427/228 |
| 4,451,118 | 5/1984 | Stalcup et al. | 350/310 |
| 4,791,076 | 12/1988 | Leggett et al. | 501/95 |

*Primary Examiner*—James D. Withers
*Attorney, Agent, or Firm*—M. E. Lachman; M. W. Sales; W. K. Denson-Low

[57] ABSTRACT

Improved fiber reinforced composites having near zero coefficients of thermal expansion are described. The improved composites include reinforcing fibers and matrix material in which gap structures which exist within the composite are filled with a bonding agent. The reinforcing fibers can be unidirectionally, bidirectionally or multidirectionally oriented within the matrix material and articles fabricated from the improved composite have reduced coefficients of thermal expansion in directions transverse to the orientations of the fibers. This improvement makes these improved composites useful for fabricating high energy laser mirror substrates.

7 Claims, 1 Drawing Sheet

METHOD OF MAKING A FIBER REINFORCED CERAMIC GLASS COMPOSITES HAVING TAILORED COEFFICIENT OF THERMAL EXPANSION

This is a division of application Ser. No. 07/766,320, filed Sep. 27, 1991, now U.S. Pat. No. 5,229,196.

BACKGROUND OF THE INVENTION

1. Field of the Invention

The present invention relates in general to fiber reinforced glass-ceramic composites. More particularly, the present invention relates to graphite fiber reinforced lithium-aluminum-silicate composites having near zero coefficients of thermal expansion which are useful in fabricating high energy laser mirror substrates.

2. Description of Related Art

Fiber reinforced composite materials have long been utilized in applications which require high strength, low weight, and specialized thermal properties. Due to their low coefficient of thermal expansion and good thermal conductivity, graphite reinforced composites, in particular, have been investigated for their possible utility in the fabrication of mirrors for high energy laser systems.

High energy laser systems utilize precision mirrors which are aligned with an excited medium. These precision mirrors have highly reflective surfaces for repeatedly reflecting radiation from the excited medium. Effective laser action depends upon a buildup of sufficient energy from these repeated reflections to produce a high energy coherent beam. If the mirrors become misaligned during operation the efficient production of the high energy laser beam can be severely compromised. One persistent cause of mirror misalignment is dimensional change due to the large amount of absorbed thermal energy at the surface of the mirror.

To prevent mirror distortion, most high energy laser systems require heat exchangers in the mirror substrate to remove the absorbed energy and minimize distortion of the optical surface. These heat exchangers, however, result in increased complexity and weight in the form of relatively high density liquid coolant, and the associated pumps and plumbing. Additionally, the flowing liquid coolant is a source of vibration. The coolant transmits pump pulsations into the mirror system and turbulent flow creates additional jitter in the mirrors and their mounts.

One approach to reducing the dimensional changes due to thermal absorption is to utilize a mirror substrate material which exhibits good thermal conductivity (K) and has an extremely low, near zero, coefficient of thermal expansion (CTE). Preferably the mirror substrate has a coefficient of thermal expansion near zero in the plane of the surface of the mirror and a high thermal conductivity perpendicular to the plane of the mirror. Many current laser mirror substrate materials fall short of this requirement. For example, ultra-low expansion titanium silicate glass or fused silica have a low coefficient of thermal expansion but also a low thermal conductivity. Material such as molybdenum, silicon, or silicon carbide are also used for laser mirror substrates but they have a high CTE as well as a high K.

Glass-ceramic composites, such as graphite reinforced lithium-aluminum-silicate (GLAS) composites have been under development for use in applications such as laser mirror substrates. GLAS composites show promise for these applications because they can be designed and fabricated into mirrors having relatively low coefficient of thermal expansion in the plane of the mirror and a high thermal conductivity in the direction perpendicular to the mirror. One class of reinforced lithium-aluminum-silicate composite is described in U.S. Pat. No. 4,791,076. The reinforced composite taught in this patent includes graphite fibers in a matrix of silica, boron phosphate and modified beta-spodumene (lithium-aluminum-silicate.) These have significantly lower coefficients of thermal expansion than both titanium silicate glasses and fused silica. In fact, beta-spodumene undergoes contraction when heated to temperatures of 700° C. or more, exhibiting a negative coefficient of thermal expansion in the range of approximately $-0.55 \times 10^{-6}/°$ F.

One problem associated with producing GLAS composites having the appropriate thermal characteristic is the highly anisotropic nature of the graphite fiber reinforced material. The coefficient of thermal expansion can vary significantly along the length of the material, thus causing a problem with the predictability of the thermal properties. Additionally, the resulting coefficient of thermal expansion is highly process dependent. Thus, even though the GLAS composites exhibit generally good thermal properties for use in high energy laser optics, they have not advanced to the point where they can be used in the absence of turbulent-flow cooling fluids.

Accordingly, it would be desirable to provide materials which can be fabricated into precision mirrors for use in high energy laser systems without the accompanying use of heat exchangers. In connection with this, it would be desirable to provide glass-ceramic composites having a near zero coefficient of thermal expansion in one plane and a high thermal conductivity in a plane perpendicular to the plane with the near zero coefficient of thermal expansion. It would also be desirable to provide methods for fabricating fiber reinforced composites having near zero coefficients of thermal expansion.

SUMMARY OF THE INVENTION

The present invention provides improved fiber reinforced composites having near zero coefficients of thermal expansion. The improved fiber reinforced composites of the present invention can be formed into articles with at least one surface having a near zero coefficient of thermal expansion. Additionally, the improved fiber reinforced composites of the present invention can be formed into articles having high thermal conductivity. These features make the present invention particularly useful for fabricating high energy laser precision mirrors which do not require turbulent flow fluid coolants to maintain dimensional stability.

This invention is based upon the discovery that gap structures exist between the matrix material and the fibers, as well as between a single fiber or bundles of fibers of reinforced matrix composites. It was further discovered that certain bonding agents can be forced into these gap structures and that by doing this, negative coefficients of thermal expansion of the composite can be brought significantly closer to zero.

Accordingly, the composites of the present invention are improved fiber reinforced composites in which a bonding agent is impregnated into the composite to fill the gap structures. The resulting improved fiber reinforced composite has a very close to zero coefficient of thermal expansion. Preferably the fiber reinforced composite is a graphite fiber reinforced lithium-aluminumsilicate glass ceramic composite and the bonding agent used to fill the gap structure is furfuryl alcohol/maleic anhydride resin. The bonding agent is cured and partially pyrolyzed within the gap structure to form a filler material having a high carbon content.

The improved fiber reinforced composites of the present invention can be fabricated into articles having tailored coefficients of thermal expansion. Depending upon the structural requirements and the intended use of the article the fibers can be multidirectionally oriented, bidirectionally oriented, or unidirectionally oriented within the article composite. A preferred article is one in which the fibers are unidirectionally oriented within the composite with the ends of the fibers forming a surface plane transverse to the unidirectional orientation of the fibers. As a feature of the present invention this surface has a near zero coefficient of thermal expansion. Furthermore, the thermal conductivity of the article is high in the direction of the fiber orientation.

A method for preparing the improved fiber reinforced composites of the present invention includes impregnating a composite of reinforcing fibers and matrix material with a bonding agent and subsequently treating the impregnated composite to bond the reinforcing fiber to the matrix material. A preferred method includes vacuum impregnating a graphite fiber reinforced lithium-aluminum-silicate glass ceramic composite with an acetone solution of furfuryl alcohol/maleic anhydride. The subsequent treating step includes heating the impregnated composite to cure and partially pyrolyze the furfuryl alcohol/maleic anhydride resin.

Further objects and advantages of the improved fiber reinforced composites of the present invention, as well as a better understanding thereof, will be afforded to those skilled in the art from a consideration of the following detailed explanation of preferred exemplary embodiments thereof.

A BRIEF DESCRIPTION OF THE DRAWINGS

DESCRIPTION OF PREFERRED EMBODIMENTS

The present invention provides improved fiber reinforced composites having near zero coefficients of thermal expansion, i.e. $0 \pm 0.5$ ppm/° C. In particular the improved fiber reinforced composites of the present invention can be fabricated to have a near zero coefficient of thermal expansion in a plane parallel with the surface of the composite and a high thermal conductivity perpendicular to that plane. These thermal properties advantageously make these composites useful in fabricating precision mirrors such as those incorporated in the optics for high energy laser systems. Those skilled in the art will appreciate, however, that the improved fiber reinforced composites of the present invention have utility in any application requiring materials having tailored and near-zero coefficients of thermal expansion, heat resistance, and thermal conductivity characteristics.

The present invention is based upon the discovery that gap structures exist in certain fiber reinforced matrix composites. These gap structures have been determined to exist between the fibers and the matrix material and probably also exist within the fibers themselves. It has further been discovered that certain bonding agents can be impregnated into the composite whereby the gap structures are filled. These bonding agents can be utilized to provide improved reinforced composites having coefficients of thermal expansion tailored to be near zero. Furthermore, these composites can be formed so that the fibers are multidirectionally oriented, bidirectionally oriented, or unidirectionally oriented. The preferred orientation largely depends upon the intended use of the composite, the structural requirements of the composite, and the intended thermal characteristics of the composite. For example, composites having unidirectionally oriented fibers can be tailored to have a coefficient of thermal expansion which is near zero in a direction transverse to the fiber orientation and to have a high thermal conductivity in the same direction as the fiber orientation.

Accordingly, the present invention includes improved fiber reinforced composite articles fabricated from fibers oriented in a matrix material. The matrix material has gap structures which exist between the fibers and the matrix material as well as within the fibers. The improved fiber reinforced composite articles are formed by filling the gap structure with a sufficient amount of a bonding agent to tailor the coefficient of thermal expansion of the composite article to near zero. The fibers can be oriented within the matrix material in a variety of directions including multidirectional, bidirectional, and unidirectional orientations. In one embodiment the fibers are unidirectionally oriented and the coefficient of thermal expansion is reduced in a direction transverse to the unidirectional orientation.

Figure 1:
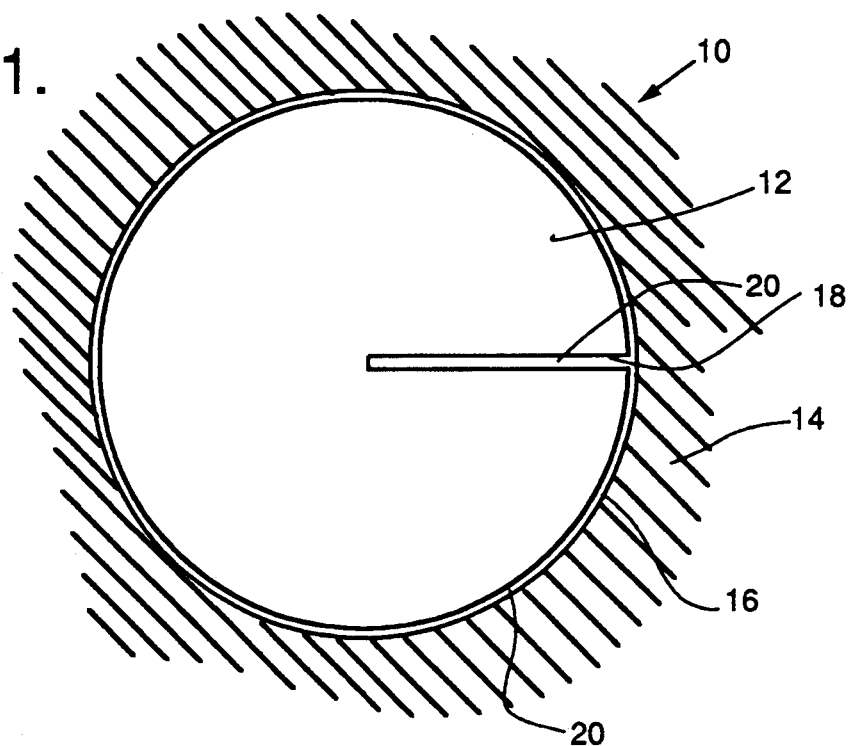
FIG. 1 is a representation of a cross-sectional end view of an improved fiber reinforced composite of the present invention.
Figure 2:
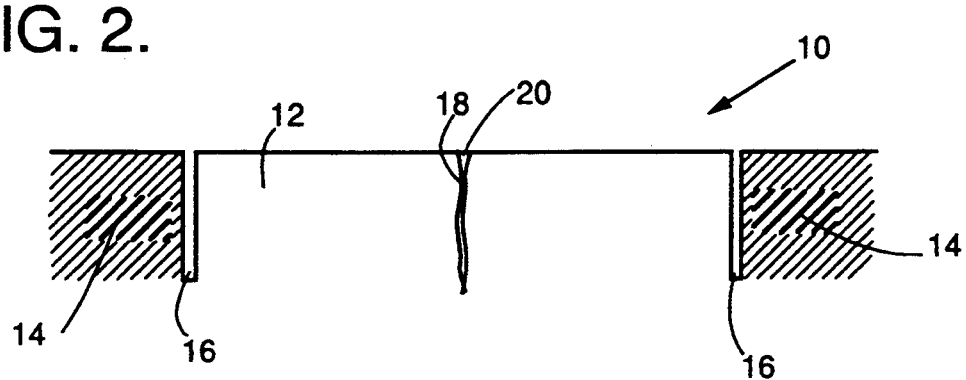
FIG. 2 is a cross-sectional side view of a representative portion of an improved fiber reinforced composite of the present invention.

FIG. 1 is a diagrammatic cross-sectional end view of an extremely small representative portion of a fiber reinforced composite 10 showing a single fiber 12 embedded in a matrix 14. Annular gap structure 16 exists between the fiber 12 and matrix material 14. Additional gap structure 18 can also exist within the fiber itself. The improved fiber reinforced composite of the present invention additionally includes bonding agent 20 which has been impregnated into the composite to fill the gap structures 16 and 18. FIG. 2 is a cross-sectional side view of the same representative fiber 12 and matrix material 14 of FIG. 1.

In accordance with the present invention, the reinforcing fibers 12 are preferably graphite fibers that are made by carbonizing fibers spun from mesophase petroleum pitch or organic fibers such as cellulose fibers, viscose rayon, polyacrylonitrile acrylic synthetic fibers, polyvinyl alcohol synthetic fibers, and others in which the fiber is substantially all carbon. Additionally, the graphite fibers preferably are bundled together into unidirectionally oriented yarns or tows.

The graphite fibers used in the improved reinforced composites of the present invention are preferably between about 5 and 15 micrometers in diameter. The fibers have a high tensile strength and a high modulus of elasticity, such as those available from AMOCO Performance Products under the trade name Pitch-120. The graphite fibers preferably represent from about 5 to about 60 volume percent of the total volume of the fiber reinforced composite.

The matrix material utilized in the improved fiber reinforced composites of the present invention is a ceramic or a glass or combinations of ceramic and glass. Suitable matrix materials are silica, boron phosphates, titanium silicates, or boron silicates. Ceramic glasses of lithium-aluminum-silicates are particularly suitable because of their low coefficient of thermal expansion and their known utility in graphite reinforced composite high energy laser mirrors. The matrix material comprises from approximately 40 to 95 volume percent of the total volume of the fiber reinforced composite. Together, the reinforcing fibers 12 and the matrix material 14 form a fiber reinforced composite having porous gaps between the reinforcing fibers and the matrix material.

The preferred composites utilized to fabricate the improved reduced thermal expansion composites of the present invention are graphite lithium-aluminum-silicate glass ceramic composites. These composites are typically prepared by forming a slurry of lithium-aluminum-silicate glass precursor in a fugitive acrylic binder such as Nicrobraz TM resin available from Wall Colmonoy Company. The slurry is then coated onto graphite tows or yarns and the resulting prepreg tapes are wound onto a take-up mandrel, forming sheets, which are then air dried. The sheets are then removed from the mandrel, flattened, and cut to desired dimensions, usually in a square configuration. The squares are stacked to form a billet preform and then partially consolidated either in a warm hot-press or an isostatic press to achieve 75% to 85% of its theoretical density.

Typical maximum temperature and pressure for this preconsolidation step are approximately 1523° K. (1250° C.) and 13.1 megapascals (MPa) or 1900 pounds per square inch gage (psig). The Nicrobraz TM fugitive acrylic binder burns off during this step. The billet preforms can be further densified in a final hot isostatic pressing step in which a temperature-pressure cycle is used to achieve full consolidation of the composite, controlled formation of crystal structure, and relief of residual stresses. Typical maximum temperature and pressure for this step are approximately 1713° K. (1440° C.) and 103 MPa (15,000 psig), respectively.

In accordance with the present invention, the graphite fiber reinforced lithium-aluminum-silicate composite has been shown to have gap structures on the order of from approximately 300 angstroms to approximately 1,000 angstroms. The gap structures exist between the graphite fibers and the lithium-aluminum-silicate and probably within the fibers themselves. As will be discussed later, these gap structures occur after the isostatic pressing as the composite is being cooled, in which the fiber material will contract and separate from the surrounding matrix. It is also believed that instead of separating from the matrix, during the contraction a few of the graphite fibers adhere to the lithium-aluminum-silicate to such a degree that the fibers split longitudinally, forming a gap structure within the fiber.

The bonding agent can be any material capable of being impregnated into porous gap structures which are on the order of 300–1,000 angstroms in width. The bonding agent preferably is also capable of forming bonds between the reinforcing fibers and the matrix material. Suitable bonding agents are metals and alloys, metal oxides, ceramics, glasses and glazes capable of melting and diffusing into porous crack structures at temperatures at which the matrix and reinforcing fibers are stable. Other suitable bonding agents are organic resins which can be formulated to diffuse into crack structures and cure within the crack structures to form adhesive bonds between the reinforcing fiber and the matrix material.

When the fiber reinforced composite is used in high temperature applications, the organic resins must be selected and treated to withstand the elevated temperatures. Accordingly, a particularly suitable bonding agent is cured and partially pyrolyzed furfuryl alcohol/maleic anhydride. The cured and partially pyrolyzed furfuryl alcohol/maleic anhydride bonding material effectively bonds the matrix material to the fiber and has a sufficiently high carbon content to maintain desirable thermal characteristics. In accordance with the present invention, the bonding agent comprises from approximately 0.5 to approximately 5 volume percent of the total fiber reinforced composite.

The furfuryl alcohol/maleic anhydride resin is impregnated into the gap structures of graphite fiber reinforced lithium-aluminum-silicate composites in which the graphite fibers are unidirectionally, bidirectionally, or multidirectionally oriented. Then, the composite is further treated to cure and partially pyrolyze the resin. The resulting improved fiber reinforced composite has a near zero coefficient of thermal expansion in a direction transverse to the primary orientation of the fibers.

The degree to which the positive or negative coefficient of thermal expansion approaches zero is dependent upon the degree to which the gap structures are filled and the degree to which the composite materials are bonded together. As an added feature of the improved fiber reinforced composites of the present invention, the thermal conductivity of the composite in the direction of the orientation of the fiber is high. The properties of the composite in this direction are controlled primarily by the graphite fibers which have a relatively high thermal conductivity. As will be shown later, the coefficient of thermal expansion in this direction is not reduced to the same degree as the coefficient of thermal expansion in the direction transverse to the orientation of the fibers.

The improved fiber reinforced composites having reduced coefficients of thermal expansion in a direction transverse to the unidirectional orientation of the fibers are prepared by first providing composites of fibers and matrix material having porous gap structures having sizes on the order of between approximately 300 angstroms and 1,000 angstroms. The gaps are then impregnated with a bonding agent and treated by partial pyrolysis to finally bind the fibers and the matrix material to produce a fiber reinforced composite having a near zero coefficient of thermal expansion.

The fiber reinforced composite can be a composite of fiber and matrix material selected from those fibers and matrix materials described above. Preferably the fibers are graphite fibers grouped into yarns or tows such as Pitch-120 graphite fibers available from Amoco Performance Products. The matrix material is preferably a lithium-aluminum-silicate composite and the fiber reinforced composite has approximately 0–2 volume % porosity. This porosity is in the form of gaps caused by the differential shrinkage and expansion of the fibers and the matrix, respectively, which occurs during the cool-down following the high-temperature processing which forms the composite.

As described above the bonding agent can be metals and their alloys, metal oxides, ceramics, glasses, glazes and organic resins capable of diffusing into porous gap structures. When the reinforced composite is the graphite fiber reinforced lithium-aluminum-silicate glass ceramic composite described above, the preferred bonding agent is furfuryl alcohol/maleic anhydride resin. Impregnating the composite with a bonding agent can be accomplished by methods known in the art for transporting fluids into small volumes. These include soaking the reinforced composite in bonding agent or a solution which incorporates bonding agent. A particularly effective methods is to utilize vacuum techniques to provide a large pressure gradient across the reinforced composite. The pressure gradient allows the bonding agent to migrate into the porous gaps. For example, furfuryl alcohol/maleic anhydride resin can be impregnated into the reinforced composite by vacuum diffusing solutions of furfuryl alcohol and a fugitive solvent into the composite. Fugitive solvents are solvents having a relatively high vapor pressure which quickly vaporize at moderate temperatures. Acetone is a particularly suitable fugitive solvent for use with furfuryl alcohol/maleic anhydride resins. However, solvents or combinations of solvents having appropriately high vapor pressures and which do not react with the resin and form miscible solutions with the resin are also suitable.

After impregnating the fiber reinforced composite with the bonding agent, the next step is to treat the impregnated composite in a manner which binds the fibers and the matrix material together. The form of the treatment process depends upon the choice of bonding agent, but normally requires heating the composite. When organic resins are the bonding agent of choice, the treating step comprises heating the impregnated composite to cure the resin and/or vaporize the fugitive solvent. Generally the treating step further requires partially pyrolyzing the resin at temperatures higher than the curing temperatures. This forms a treated bonding agent having a high carbon content with controlled and more desirable thermal properties.

When furfuryl alcohol/maleic anhydride resin is used as the bonding agent, it is preferred that the resin is first cured at temperatures of between about 100° C. to 200° C. for a period of time ranging from about 1 hour to 100 hours. This initial curing step is then preferably followed by partial pyrolysis at temperatures of between about 175° C. to 300° C. for periods of time ranging from 2 hours to 40 hours.

As mentioned above, the improved fiber reinforced composites of the present invention are particularly suitable for fabricating articles such as passively cooled precision mirrors for use in high energy laser optics. By filling the voids created by gap structures and controlling the degree of bonding of the fibers to the matrix material the coefficient of thermal expansion at the mirror surface can be tailored to near zero values. Advantageously the mirrors also have consistently uniform coefficients of thermal expansion.

Figure 3:
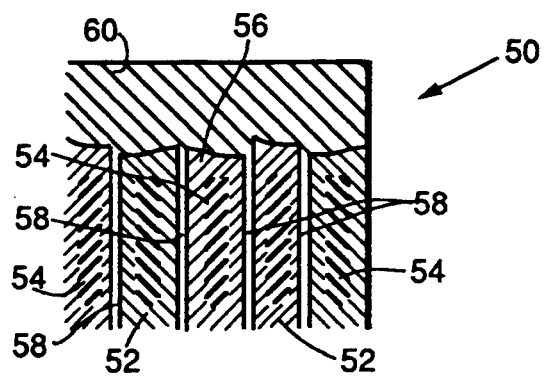
FIG. 3 is a cross-sectional side view of a representative high energy laser mirror substrate.

For example, high energy laser mirrors can be fabricated from the improved graphite fiber reinforced lithium-aluminum-silicate composites described above. FIG. 3 illustrates a cross-sectional side view of a representative high energy laser mirror substrate 50 in which the graphite fibers 52 are unidirectionally oriented within the lithium-aluminum-silicate matrix material 54. The composite material is fabricated so that the surface of the composite 56 forms a plane perpendicular to the unidirectional orientation of the fibers. When the gap structures within the composite are effectively filled with a bonding agent 58 and the composite fibers and matrix material form effective bonds with the bonding agent, the composite surface has a coefficient of thermal expansion near zero. Additionally, because the fibers dominate in the plane perpendicular to the surface of the composite, the thermal conductivity in that plane is high.

In order to maximize the reflectivity of the mirror surface, a layer of diamond like carbon coating 60 is applied to the surface of the composite. This coating is normally finally polished to a high gloss to produce a very smooth mirror surface onto which highly reflective coatings can be deposited. Since the coefficient of thermal expansion in the direction parallel with the mirror surface is near zero, the surface is not subject to distortion during the period of cooling and heating. Thus, high energy laser mirrors which do not require turbulent flow cooling fluids, can be advantageously fabricated from the improved fiber reinforced composites of the present invention. These mirrors withstand exposure to high temperatures and low temperatures without surface distortion because the coefficient of thermal expansion is near zero at the surface. Simultaneously, the mirrors are capable of conducting heat to the appropriate heat sinks in the direction perpendicular to the surface of the mirror.

The following non-limiting Example 1 illustrates preparation of a fiber reinforced composite prior to impregnation with a bonding agent in accordance with the present invention. Non-limiting Example 2 illustrates a preferred method for preparing an improved fiber reinforced composite of the present invention. Example 3 illustrates that the porous gap structures in the improved composite are effectively filled by the bonding agent.

EXAMPLE 1

A single specimen of polished graphite reinforced lithium-aluminum-silicate glass ceramic composite (GLAS) prepared according to the method described above was prepared for examination by scanning electron microscopy. The specimen consisted of 29 volume % unidirectionally oriented Pitch-120 graphite fibers from Amoco Performance Products, 68 volume % lithium-aluminum-silicate (LAS) matrix and 3 volume % porosity. The scanning electron micrographs which were taken of the specimen revealed possible annular gaps between the individual 10 micron diameter fibers and the LAS matrix. Calculations were performed which indicated the average size of these annular gaps was 450 angstroms. These calculations took into account differential shrinkage and expansion of the fibers and the matrix, respectively, during cool-down of the composite in the hot isostatic press used to form the composite. Surface area analysis using Brunauer, Emmett and Teller (BET) methodologies indicated that the internal surface area of this specimen was approximately 0.23 $m^2/g$, which corroborated the calculated porous gap size of 450 angstroms. This gap size was sufficient to allow penetration by a fluid bonding agent.

EXAMPLE 2

Three samples of GLAS glass ceramic composite in the shape of cylinders having a 0.5 inch length and a 0.25 inch diameter were machined from the same process batch of composite as the specimen of Example 1. The cylindrical samples of GLAS glass ceramic composite were machined with the unidirectional Pitch 120 fibers oriented in an X direction for one sample, the Y direction for the second sample and the Z direction for the third sample. The X and Y directions were perpendicular to the Z direction. The X and Y directions also form a planar surface with the ends of the Pitch 120 fibers. The coefficient of thermal expansion was measured for each sample to establish the coefficient of thermal expansion in the X, Y, and Z directions, respectively, using a Dupont Thermal Mechanical Analyzer. The measured values were $-1.86$, $-2.72$, and $-1.25$ ppm/° C. for the X, Y, and Z directions, respectively. These values were far too removed from zero to allow consideration of this composite material for passively cooled high energy laser mirrors.

The three cylindrical samples were cleaned to remove any surface contaminants that could block access to the porous gaps within the composite material. The cleaning consisted of ultrasonically bathing the samples in Freon for 15 minutes and then vapor degreasing the cylinders with 1,1,1,-trichloroethane for 5 minutes. The samples were then dried under vacuum for 2 hours at 200° C.

Each cylindrical fiber reinforced sample was then vacuum impregnated with a solution consisting of 5% by weight maleic anhydride, 5% by weight acetone, and 90% by weight furfuryl alcohol. The acetone served to reduce the viscosity of the furfuryl alcohol/maleic anhydride resin and enhanced the ability of the resin to penetrate the composite crack structure. The impregnated composite samples were then heated for 62 hours at 135° C. to cure the furfuryl alcohol/maleic anhydride resin. Following this heat treatment, the coefficient of thermal expansion in the axial direction was measured again. The measured values were 1, 0, and $-1$ ppm/° C. for the X, Y and Z directions respectively.

The composite samples were then heated for 42 hours at 210° C. to partially pyrolyze the cured furfuryl alcohol/maleic anhydride resin. The coefficient of thermal expansion was again measured axially, and the measured values were $-1.4$, $-1$ and $-1$ ppm/° C. for the X, Y, and Z directions, respectively.

Each composite sample was then impregnated a second time using the same vacuum technique and a solution of furfuryl alcohol/maleic anhydride resin in acetone. The cylinders were again heated for 22 hours at 130° C. and 64 hours at 175° C. to cure the furfuryl alcohol/maleic anhydride resin. Finally, the samples were heated at 221° C. for two sessions of 24 hours and 22 hours, respectively. These two heating sessions resulted in partial pyrolysis of the furfuryl alcohol/maleic anhydride.

The final X and the final Y coefficient of thermal expansion were measured to be 0.00 and $-0.04$ ppm/° C. respectively. This indicates that a surface formed by the X and Y axes has a near zero coefficient of thermal expansion. The Z direction coefficient of thermal expansion was not as close to zero at $-1.32$ ppm/° C. because that particular direction is dominated by the graphite fibers oriented in that direction. However, this is a sufficiently low value for this improved composite to be utilized as a high energy laser mirror, since mirror bowing is insensitive to thermal expansion in this Z direction.

EXAMPLE 3

The improved GLAS glass ceramic composite samples prepared according to the procedure described in Example 2 were tested for resistance to moisture absorption. The three cylinders were allowed to absorb water to a steady state condition at ambient conditions. Less than 0.01% increase in the weight of the cylinders was recorded. This minimum or negligible amount of moisture absorption indicates that the cured partially pyrolyzed furfuryl alcohol/maleic anhydride resin had penetrated into the porous gaps, filled the gaps, and bonded the matrix material to the graphite fibers.

Having thus described exemplary embodiments of the present invention, it should be noted by those skilled in the art that the disclosures herein are exemplary only and that alternatives, adaptations and modifications may be made within the scope of the present invention.

What is claimed is:

1. A method for preparing improved fiber reinforced composites having a tailored coefficient of thermal expansion, said method comprising the steps of:
   (a) forming a preform comprising a matrix material in a fugitive binder and selected fibers;
   (b) partially consolidating said preform by exposure to an elevated temperature having a maximum of 1523° K. (1250° C.) and an elevated pressure having a maximum of 13.1 MPa (1900 psig) to remove said fugitive binder and form a partially consolidated preform;
   (c) completing consolidation of said partially consolidated preform by exposure to an elevated temperature having a maximum of 1713° K. (1440° C.) and an elevated pressure having a maximum of 103 MPa (15,000 psig) to form a consolidated composite;
   (d) cooling said consolidated composite whereby gap structures of about 300 to 1,000 angstroms in size form in said composite between said matrix material and said fibers, and within said fibers;
   (e) impregnating said composite having said gap structures with a bonding agent, said bonding agent comprising about 0.5 to 5 volume percent of said composite;
   (f) treating said impregnated composite to cure said bonding agent and bond said fibers and said matrix material.

2. The method of claim 1 wherein said composite of fibers and matrix material is graphite fiber reinforced lithium-aluminum-silicate.

3. The method of claim 1 wherein said bonding agent is furfuryl alcohol/maleic anhydride resin.

4. The method of claim 3 wherein said impregnating step is accomplished by vacuum impregnating said composite with an acetone solution of said furfuryl alcohol/maleic anhydride resin.

5. The method of claim 4 wherein said treating step further comprises the steps of:
   curing said furfuryl alcohol/maleic anhydride resin in said impregnated composite at a temperature of from approximately 100° C. to 200° C. for a period of time ranging from approximately 1 hour to 100 hours; and
   partially pyrolyzing said cured furfuryl alcohol/maleic anhydride resin at a temperature of from approximately 175° C. to 300° C. for a period of time ranging from approximately 2 hours to 40 hours.

6. The method of claim 5 further comprising the steps of repeating said impregnating, said curing and said partially pyrolyzing steps a plurality of times.

7. A method for preparing an improved fiber reinforced composite having a tailored coefficient of thermal expansion, said method comprising the steps of:

(a) forming a slurry of a precursor of a matrix material in a fugitive binder;

(b) coating said slurry on selected fibers to form prepreg tapes;

(c) drying said prepreg tapes;

(d) forming said dried prepreg tapes into a desired shape, to form shaped prepregs;

(e) stacking said shaped prepregs to form a billet preform;

(f) partially consolidating said billet preform by application of pressure of up to a maximum of 13.1 Mp (1900 psig) and heat at temperatures of up to a maximum of 1523° K. (1250° C.) to remove said fugitive binder and form a partially consolidated billet preform;

(g) completing consolidation of said partially consolidated billet preform by application of pressure of up to a maximum of 103 Mp (15,000 psig) and temperatures of up to a maximum of 1713° K. (1440° C.) to form a consolidated composite;

(h) cooling said consolidated composite whereby gap structures having a size of about 300–1,000 angstroms form in said composite between said matrix material and said fibers, and within said fibers;

(i) impregnating said composite having said gap structures with a bonding agent comprising about 0.5–5 volume percent of said composite; and (j) treating said impregnated composite to bond said fibers and said matrix material.

* * * * *